(12) United States Patent
Shingu et al.

(10) Patent No.: US 6,292,243 B1
(45) Date of Patent: Sep. 18, 2001

(54) TWO-LAYER LIQUID CRYSTAL PANEL HAVING A POLYMER LIQUID CRYSTAL LAYER AND EQUIPMENT USING THE SAME

(75) Inventors: Hiroshi Shingu, Minamiazumi-gun; Takashi Miyazaki, Matsumoto; Kiminori Kanamori, Hataka-machi; Kenichi Okuhara, Kiso-mura; Hidenori Makiba, Matsumoto, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/068,205
(22) PCT Filed: Sep. 2, 1997
(86) PCT No.: PCT/JP97/03062
§ 371 Date: Oct. 23, 1998
§ 102(e) Date: Oct. 23, 1998
(87) PCT Pub. No.: WO98/10327
PCT Pub. Date: Mar. 12, 1998

(30) Foreign Application Priority Data

Sep. 2, 1996 (JP) .................................................. 8-232328
Feb. 5, 1997 (JP) .................................................. 9-023008

(51) Int. Cl.⁷ .............................................. G02F 1/1333
(52) U.S. Cl. ............................................ 349/122; 349/86
(58) Field of Search ................ 349/86, 122; 252/299.01

(56) References Cited

U.S. PATENT DOCUMENTS

| | | | |
|---|---|---|---|
| 4,580,877 | * | 4/1986 | Washo .................................. 350/345 |
| 5,392,142 | * | 2/1995 | Mitsutake et al. ...................... 359/53 |
| 5,686,017 | * | 11/1997 | Kobayashi et al. ............. 252/299.01 |
| 5,703,837 | * | 12/1997 | Umemoto et al. ...................... 368/88 |
| 5,761,158 | * | 6/1998 | Azuma et al. ........................ 368/205 |
| 5,841,738 | * | 11/1998 | Kamei et al. ......................... 368/205 |
| 6,020,943 | * | 2/2000 | Sonoda et al. .......................... 349/61 |

FOREIGN PATENT DOCUMENTS

| | | |
|---|---|---|
| 0 371 695 A2 | 6/1990 | (EP) . |
| 0 724 180 A2 | 7/1996 | (EP) . |
| 59-32755 | 8/1984 | (JP) . |
| 60-230605 | 11/1985 | (JP) . |
| 61-160486 | 10/1986 | (JP) . |
| 62-47625 | 3/1987 | (JP) . |
| 5-19990 | 3/1993 | (JP) . |
| 5-119302 | 5/1993 | (JP) . |
| 07104288 | 10/1993 | (JP) . |
| 5-273527 | 10/1993 | (JP) . |
| 07253570 | 3/1994 | (JP) . |
| 07056157 | 3/1995 | (JP) . |
| 07294923 | 11/1995 | (JP) . |
| WO 94/23331 | 3/1994 | (WO) . |

* cited by examiner

Primary Examiner—William L. Sikes
Assistant Examiner—Tarifur R. Chowdhury
(74) Attorney, Agent, or Firm—Harness, Dickey & Pierce, P.L.C.

(57) ABSTRACT

This invention relates to a two-layer display type of electronic equipment having a liquid crystal panel (1) and a background display portion (2) on a rear surface side thereof. The liquid crystal panel (1) has a main liquid crystal panel unit (10) formed by inserting a liquid crystal layer (13) between a first substrate (11) and a second substrate (15). The liquid crystal layer (13) is set to either a light-transmitting state or a light-scattering state by an electrical field that is applied to the liquid crystal. This liquid crystal panel (1) has a transparent layer (21) on the rear surface of the second substrate (15). If the refractive index of this transparent layer (21) is $n_1$, the refractive index of the second substrate (15) in contact with the front side of this transparent layer is $n_0$, and the refractive index of the air layer in contact with the rear side of the transparent layer (21) is $n_2$, the following relationship is established: $n_2 < n_0 < n_1$.

33 Claims, 8 Drawing Sheets

TWO-LAYER LIQUID CRYSTAL PANEL HAVING A POLYMER LIQUID CRYSTAL LAYER AND EQUIPMENT USING THE SAME

TECHNICAL FIELD

This invention relates to a liquid crystal panel and electronic equipment that uses such a liquid crystal panel.

BACKGROUND ART

In addition to various kinds of timepieces used as wristwatches, such as an analog timepiece displaying time by hands and a digital timepiece displaying time on a liquid crystal device, there has recently been developed a two-layer display type of timepiece in which a liquid crystal panel is superimposed on the surface of an analog timepiece, as disclosed in, for example, Japanese Patent Publication No. 59-32755. With such a two-layer display type of timepiece, a digital time display can be superimposed on top of an analog time display, to make it visible.

In the prior art, the display of a liquid crystal panel is often of a color that has a low brightness, such as black, which means that the display of the liquid crystal panel cannot be clearly seen if the analog dial plate is not of a color that has a high level of brightness, such as white. This limits the design of such a dial plate.

That is why a display element having a polymer dispersed liquid crystal layer has been developed, as disclosed in International Publication No. WO94/23331. This liquid crystal layer has the property of being transparent when no electrical field is applied thereto, but it diffuses or scatters light when an electrical field is applied. Therefore, a light-scattering region to which an electrical field has been applied appears to be white or gray, making it possible to display characters or the like. Since the color of this display portion is white or gray, that in itself is novel, and it means that the dial plate can be given a color of a low level of brightness, such as black, blue, or red, and thus the dial plate can be freely designed.

In this case, light is scattered both forward and backward with respect to the direction in which the light is incident, within a region of the polymer dispersed liquid crystal layer to which the electrical current is applied. When a transmissive type of liquid crystal panel has been fabricated by using this polymer dispersed liquid crystal layer, light that is scattered forward in the direction in which light is incident (hereinafter called "forward-scattered light") strikes the eyes of the observer, so this forward-scattered light can be used to provide a liquid crystal display that is white or gray.

A wristwatch or the like is required to be compact, lightweight, and energy-thrifty, so it is often inevitable that a reflective liquid crystal panel is used therefor. In such a case, light that is scattered backward with respect to the light-incident direction (hereinafter called "backward-scattered light") strikes the eyes of the observer. On the other hand, forward-scattered light is directed along the direction in which light is incident, so it does not strike the eyes of the observer.

Research performed by the present inventors has shown that, when a reflective liquid crystal panel has been constructed by using a polymer dispersed liquid crystal layer, there is insufficient backward-scattered light, so that it is not possible to provide a suitable liquid crystal display in white or gray if the forward-scattered light is not reflected. They have determined that this is particularly obvious when the quantity of backward-scattered light is greater than the quantity of forward-scattered light.

In this two-layer display type of timepiece, a member capable of reflecting the forward-scattered light is simply the dial plate, which is disposed forward of the liquid crystal panel in the direction in which light is incident. However, if this dial plate has a low level of brightness, insufficient light is reflected from the dial plate, and thus the display on the liquid crystal layer can not be seen. To counter this, there is no option but to make the dial plate a reflective surface, but this has the effect of further limiting the design of the dial plate.

When a structure is used that causes the forward-scattered light to be reflected outside of the liquid crystal panel, the forward-scattered light diffuses within the space between the liquid crystal panel and the dial plate, generating a loss of light reflected off the dial plate and returning towards the front side.

Furthermore, if forward-scattered light is reflected at a location far from the liquid crystal layer that generates the backward-scattered light, and if the line of sight of the viewer is at an angle to the perpendicular of the liquid crystal panel, there is a danger that a duplicated display will be caused by the pattern formed by backward scattering and the pattern formed by forward scattering.

Such problems are not limited to a two-layer display type of timepiece; they form a common subject of technical concern in the design of other types of electronic equipment in which a background display portion is provided behind a liquid crystal layer.

DISCLOSURE OF THE INVENTION

This invention was devised in the light of the above described problems and has as an objective thereof the provision of a liquid crystal panel which makes it possible to expand the design limits of electronic equipment and which also makes the display thereof clearly visible.

A further objective of this invention is to provide a two-layer display type of electronic equipment which makes it possible to expand the design limits and which also makes the display thereof clearly visible.

A yet further objective of this invention is to provide electronic equipment which can reduce the occurrence of duplicated displays.

In order to solve the above described technical problems, there is provided a liquid crystal panel in accordance with a first aspect of this invention, comprising:

a first substrate which is disposed on a side on which external light is incident and on which is formed at least one first electrode;

a second substrate which is disposed facing the first substrate and on which at least one second electrode is formed;

a liquid crystal layer which is inserted between opposing surfaces of the first and second substrates and which is set to one of a light-transmitting state and a light-scattering state, based on a voltage applied between the at least one first electrode and the at least one second electrode; and at least one transparent layer disposed forward of the liquid crystal layer in the light-incident direction;

wherein the at least one transparent layer is formed of a material having a refractive index that differs from the refractive index of an optically transmissive medium in contact with the transparent layer.

With this aspect of the invention, the liquid crystal layer in a region in which a voltage equal to or more than the threshold voltage of the liquid crystal is applied by the at least one first electrode and the at least one second electrode (hereinafter called "voltage application region") is set to a light-scattering state. Of this light, the light that is scattered forward with respect to the light-incident direction is incident on the transparent layer. This transparent layer has a refractive index that differs from that of the optically transmissive medium in contact therewith. Thus, part of the forward-scattered light passes through the transparent layer, but, since there is a discontinuity in refractive index at the interface between the transparent layer and the optically transmissive medium, another part thereof is reflected by that interface. Therefore, both backward-scattered light and forward-scattered light generated in the voltage application region of the liquid crystal layer strike the eyes of the observer, increasing the degree of light-scattering. This makes it possible to display a liquid crystal display pattern which is of a color having a high level of brightness, such as white or gray, and which also has increased illuminance.

In a region in which no voltage is applied, or in which a voltage that is less than the threshold voltage of the liquid crystal is applied, (hereinafter called "voltage non-application region"), the liquid crystal layer is in a light-transmitting state so that light that is incident on the liquid crystal panel passes through the liquid crystal layer and the transparent layer, enabling a display of a background pattern that is under the liquid crystal panel. Part of this through light is reflected by the interface between the transparent layer and the optically transmissive medium. However, a result of making the liquid crystal display pattern brighter, by using forward-scattered light reflected from the interface between the transparent layer and the optically transmissive medium, is to increase the contrast ratio between that liquid crystal display pattern and the background pattern.

Thus, if sufficient light can be guaranteed to be reflected by the transparent layer arid a background display portion such as the dial plate of a timepiece is provided on the rear side of the liquid crystal panel, the display of the liquid crystal layer can be made conspicuous, even if the reflective surface of that background display portion has a low level of brightness.

In this case, it could be conceived to dispose a transparent layer between the liquid crystal panel and the background display portion during the fabrication of a device that uses this liquid crystal panel, such as the above described two-layer display type of timepiece. Alternatively, it could be conceived to form a transparent layer beforehand on the background display portion.

One of the checks performed on this type of liquid crystal panel before the final product is assembled is a visual check to ensure that the liquid crystal panel alone can display the desired image pattern when used in practice. Since a transparent layer that makes the image pattern easy to see could be provided on the liquid crystal panel of this invention, the quality of the display can be determined reliably by a visual check of the liquid crystal panel alone. Therefore, if a display fault should occur, it can of course be detected before the panel is assembled into electronic equipment.

In contrast thereto, if a transparent layer is first disposed in a finished product to which the panel is incorporated, as in the above-described two conventional techniques, the image pattern is displayed by only backward-scattered light when the liquid crystal panel alone is checked, and it is therefore difficult to determine the quality of the display.

Furthermore, since forward-scattered light can be reflected by the transparent layer disposed within the panel in the liquid crystal panel of this invention, losses of the forward-scattered light can be reduced in comparison with structures in which the light is reflected outside the liquid crystal panel, as in the above-described two conventional techniques.

In addition, the occurrence of duplicated displays can be reduced if a two-layer display type of electronic equipment is constructed by using the liquid crystal panel of this invention. In other words, since the liquid crystal layer that creates backward-scattered light and the transparent layer that causes the reflection of forward-scattered light are placed in contact by this invention, it is difficult for a duplicated display to occur, even when the line of sight is inclined with respect to the liquid crystal panel. Conversely, in the above-described two conventional techniques, there is a large distance between the transparent layer that reflects the forward-scattered light and the liquid crystal layer, so that duplicated displays can easily occur.

With this aspect of the invention, display quality can be improved because the forward-scattered light is reflected back, but this effect is more striking if the quantity of light scattered forward in the light-incident direction is greater than the quantity of light scattered backward against the light-incident direction.

In this case, a polymer dispersed liquid crystal layer comprising a liquid crystal and polymers can be exemplified as a liquid crystal layer that can be set to a light-transmitting state or a light-scattering state, based on an applied voltage.

The at least one transparent layer can be formed of a material having a refractive index that differs from that of an optically transmissive medium in contact therewith. Examples of such a transparent material could be glass, polymer films, transparent electrode materials, and interference films. If an interference film is used, the display can also be colored.

The at least one transparent layer could be formed to be in contact with the second substrate. As an example thereof, a first main surface of the at least one transparent layer could be formed to be in contact with a surface on the opposite side of the second substrate from the opposing surface. This configuration makes it possible to reduce the occurrence of duplicated displays of the liquid crystal display pattern, because the transparent layer is in close contact with the liquid crystal layer. In this case, an optically transmissive medium in contact with this transparent layer is the second substrate and the interface therebetween, which forms a reflective surface, is the first main surface. The transparent layer in this case may be formed of a material having a different refractive index from the refractive index of the second substrate. More preferably, the at least one transparent layer may be formed of a material having a refractive index larger than the refractive index of the second substrate. This is more effective when, for example, a second main surface on the opposite side from the first main surface of the at least one transparent layer is formed to be in contact with an air layer. If this condition is set, and if the refractive index of the second substrate is $n_0$, the refractive index of the at least one transparent layer is $n_1$, and the refractive index of the air layer is $n_2$, the following relationship can be established: $n_2<n_0<n_1$. This configuration enables a large difference in refractive indices between the second substrate and the transparent layer, thus increasing the reflectance at the first main surface that is the interface therebetween. In addition, the reflectance at a second main surface can be increased as a result of causing reflections at this second main surface, which is the interface between the transparent layer and an air layer, and by creating a large difference in refractive indices between the transparent layer and the air layer.

The at least one transparent layer may be formed of the same material as the transparent electrode material that forms the at least one second electrode. By making the at least one second electrode formed on the surface of the second substrate of the same material as the transparent layer formed on the rear surface of the second substrate, the formation of films on the two surfaces of the second substrate can be done with the same fabrication apparatus, increasing the throughput, which makes it possible to reduce the cost of the liquid crystal panel.

A material such as tin oxide may be used as the material utilized for both the at least one transparent layer and the at least one second electrode. The refractive index of tin oxide ($SnO_2$) with respect to light of a wavelength of 0.55 $\mu$m is 1.9. The second substrate is generally made of glass whose main component is $SiO_2$ (refractive index approximately 1.5), so if the refractive index of air is considered to be 1.0, the above inequality becomes:

$$n_2 = 1.0 < n_0 = 1.5 < n_1 = 1.9$$

Thus $n_1 - n_0 = 0.4$ and $n_2 - n_1 = 0.9$, making it possible to ensure a large difference in refractive indices.

The at least one transparent layer may be formed on a surface on the opposite side of the second substrate from the opposing surface, with an air layer therebetween. In this case, the optically transmissive medium in contact with the transparent layer is the air layer, enabling the reflection of light from that interface. Therefore that transparent layer is formed of a material having a refractive index that differs from the refractive index of the air layer.

The at least one transparent layer may be disposed between the liquid crystal layer and the at least one second to electrode. In such a case, the optically transmissive medium in contact with the transparent layer is the at least one second electrode, enabling the reflection of light from that interface. Therefore the transparent layer is formed of a material having a refractive index that differs from the refractive index of the at least one second electrode.

The at least one transparent layer may also be formed between the at least one second electrode and the second substrate. In such a case, the optically transmissive medium in contact with the transparent layer is the at least one second electrode and the second substrate, enabling the reflection of light from both of those interfaces. Therefore the transparent layer is formed of a material having a refractive index that differs from the refractive indices of the at least one second electrode and the second substrate.

The at least one transparent layer may be formed on part of a flat surface region facing the liquid crystal layer. Such a configuration ensures that forward-scattered light can be reflected by a region where the transparent layer exists, whereas this effect is not obtained in a region with no transparent layer. Therefore, the viewer gets the feeling that the former portion is a strongly contrasting display, whereas the latter portion is a weakly contrasting display. This can be used to create different impressions depending on display position.

The at least one transparent layer may be formed of different materials having differing refractive indices, disposed in different locations within the same flat surface region facing the liquid crystal layer. Since the reflectance of the forward-scattered light varies with location in this configuration, this can be used to create different impressions in a manner similar to that described above.

A plurality of transparent layers may be formed in a stack. In such a case, if adjacent transparent layers are formed of materials having different refractive indices, the forward-scattered light can be reflected at each of the interfaces between the transparent layers.

More specifically, the liquid crystal panel may be configured in such a manner that first to Nth (where $N \geq 2$) of these the transparent layers are stacked on one another, and adjacent transparent layers are formed of materials having different refractive indices;

the first transparent layer located in a previous stage in the light-incident direction is formed to be in contact with a surface on the opposite side of the second substrate from the opposing surface, and the Nth transparent layer is formed to be in contact with an air layer; and the refractive indices of the first to Nth transparent layers are set to increase in the light-incident direction.

With this configuration, forward-scattered light can be reflected at each of the interfaces between the transparent layers and, in addition, a large difference in refractive indices can be ensured between the Nth transparent layer and the air layer, so that the reflectance at that interface can be made large.

In this structure in which a plurality of transparent layers are stacked, it is also possible to vary the number of superimposed transparent layers at different locations within the region facing the liquid crystal layer. In this case too, the reflectance of the forward-scattered light can be varied in different locations, which can vary the impressions imparted by the display; in a similar manner to that described above.

According to another aspect of this invention, there is provided electronic equipment, comprising:

a liquid crystal panel which is disposed on a side on which external light is incident; and a background display portion which is disposed forward of the liquid crystal panel with respect to the light-incident direction;

wherein the liquid crystal panel comprises:

a first substrate which is disposed on the side on which external light is incident and on which at least one first electrode is formed;

a second substrate which is disposed facing the first substrate and on which at least one second electrode is formed;

a liquid crystal layer which is inserted between opposing surfaces of the first and second substrates and which is set to one of a light-transmitting state and a light-scattering state, based on a voltage applied between the at least one first electrode and the at least one second electrode, to make the background display portion visible when in the light-transmitting state; and at least one transparent layer disposed forward of the liquid crystal layer in the light-incident direction, wherein the at least one transparent layer is formed of a material having a refractive index that differs from the refractive index of an optically transmissive medium in contact with the transparent layer.

This electronic equipment is configured of the liquid crystal panel in accordance with this invention and a background display portion provided on the rear side thereof. With this electronic equipment, a strongly illuminated liquid crystal display pattern can be displayed in a region where the liquid crystal layer of the above liquid crystal panel has been set to the light-scattering state and, in addition, it is possible to see the background display portion in a region where the liquid crystal layer has been set to the light-transmitting state. In other words, a number of different displays can be seen at the same time.

Since the forward-scattered light is reflected at the interface with the transparent layer even when the background display portion comprises a light-reflecting portion of a low brightness, the illuminance of the liquid crystal display pattern does not fall.

This background display portion may be an analog timepiece comprising a dial plate and an indicator means, for example, in which case this invention has the effect of reducing restrictions on the dial plate design.

If the background display portion is of a color having a low brightness, the background display portion could be difficult to see at times, mainly at night-time, so an illumination means may be provided to illuminate this background display portion.

This background display portion is not limited to a means of forming a display from the light passing through a liquid crystal panel; it may include a light-emitting portion that emits an optical pattern of a background image. Such a background display portion could be configured of a backlit liquid crystal panel for a background image display, or means for self-generating light from an electrical supply, such as an LED. In such a case, the background display portion can be seen in a bright state, even when only a small amount of external light is passing through the liquid crystal panel, such as at night.

BEST MODE FOR CARRYING OUT THE INVENTION

Embodiments of the present invention will be described below with reference to the accompanying drawings.

First Embodiment

Figure 1:
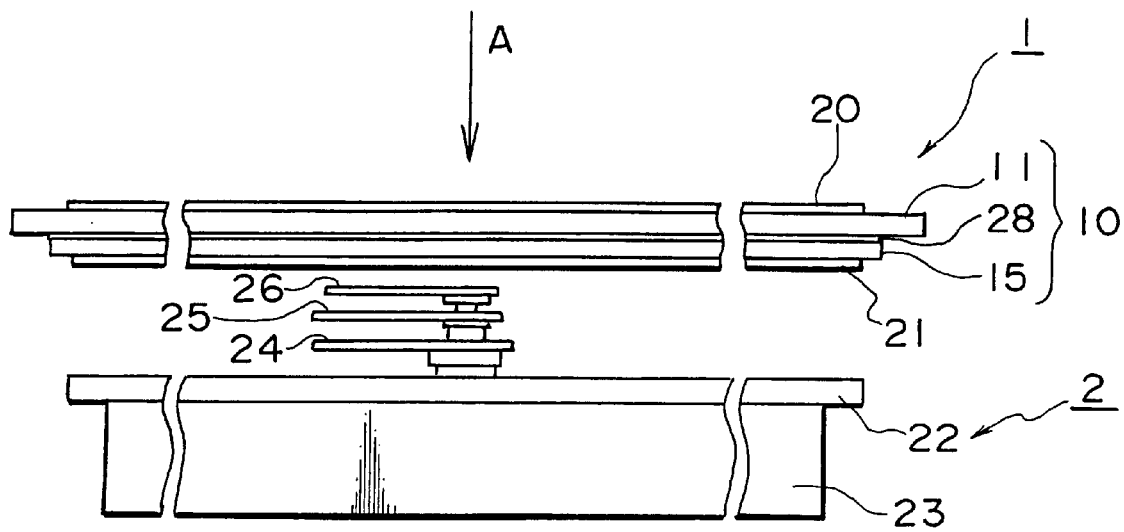
FIG. 1 is a schematic side view of essential components of a two-layer display type of timepiece provided with a liquid crystal panel in accordance with a first embodiment of this invention.

First of all, FIG. 1 is a schematic side view of essential components of a two-layer display type of timepiece (electronic equipment) which is provided with a liquid crystal panel in accordance with a first embodiment of this invention. As shown in the figure, this two-layer display type of timepiece receives light which is incident from a direction A, and has a liquid crystal panel 1 that provides a first-layer display. There is also a background display portion 2 that provides a second-layer display, disposed forward of the liquid crystal panel 1 in this direction A.

The liquid crystal panel 1 comprises a main liquid crystal panel unit 10, a ultraviolet-blocking film 20 that covers substantially the entire front surface of the main liquid crystal panel unit 10, and a transparent layer 21 that covers substantially the entire rear surface of the main liquid crystal panel unit 10. The main liquid crystal panel unit 10 will be described later.

The background display portion 2 that is disposed on the rear side of the liquid crystal panel 1 is configured as an analog timepiece. In other words, the background display portion has a dial plate 22, and a casing 23 for the movement of a timepiece is disposed on the rear side thereof. An hour hand 24, a minute hand 25, and a second hand 26 are disposed on the surface of the dial plate 22, and these hands 24, 25, and 26 are driven by the movement within the casing 23. Note that the main liquid crystal panel unit 10, the dial plate 22, and the casing 23 are held by means such as a frame member (not shown in the figure) in such a manner that they are mutually parallel.

Figure 2:
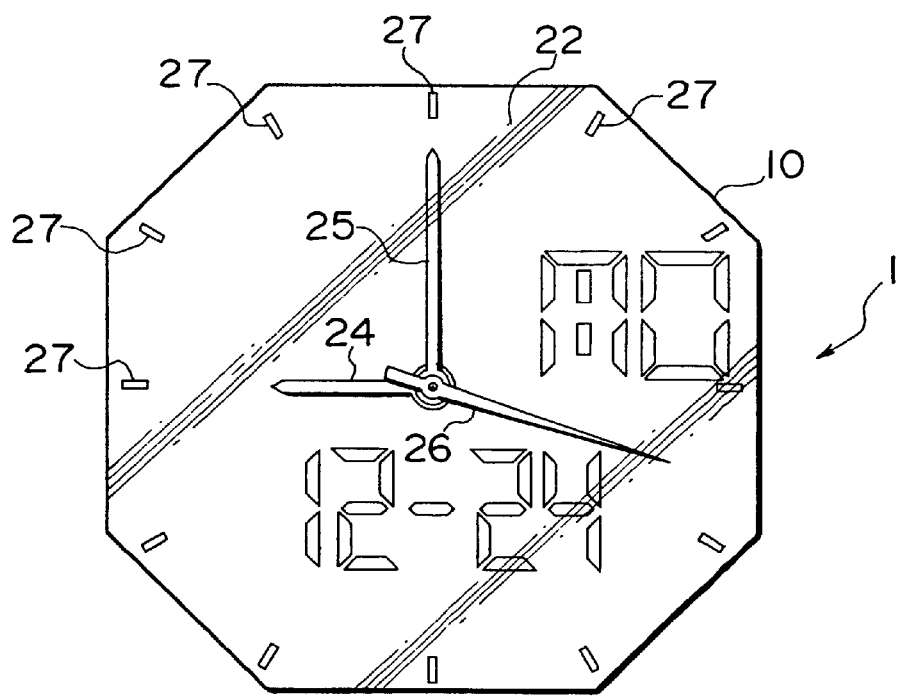
FIG. 2 is a front view of the essential components of the first embodiment.

As shown in FIG. 2, this two-layer display type of timepiece provides a digital information display by the main liquid crystal panel unit 10 and an analog time display by the background display portion 2. In FIG. 2, a day-of-the-week display "mo" and a date display "12–24" are digital displays provided by the main liquid crystal panel unit 10. Tick marks 27 are formed on the dial plate 22 to enable the analog time display by the hands 24, 25, and 26. Note that the information display provided by the main liquid crystal panel unit 10 is not limited to displays of the day of the week and the date, and various other displays are possible such as times, a timer, a stopwatch, or an alarm.

Figure 3:
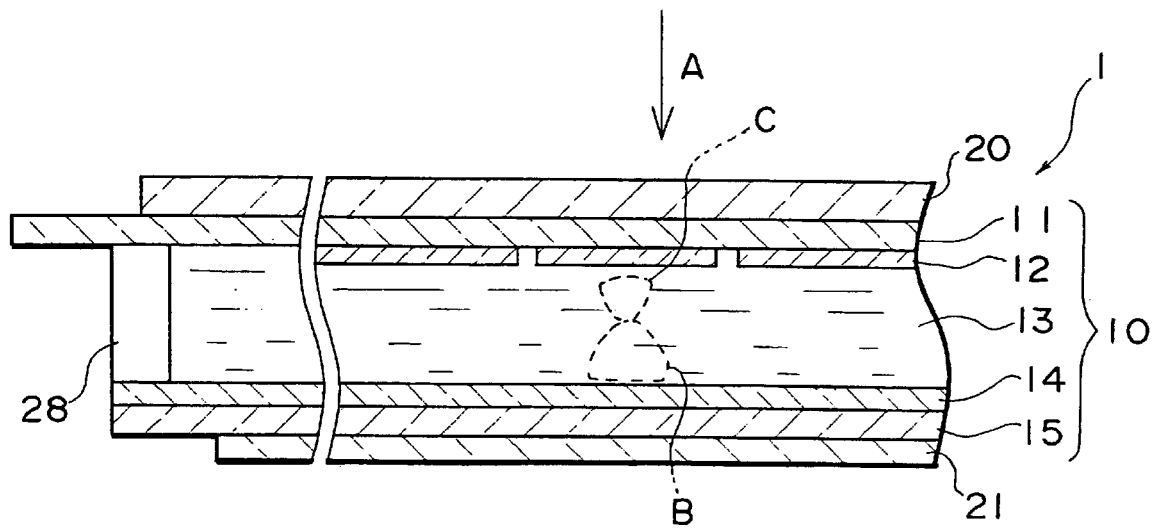
FIG. 3 is a cross-sectional view through the liquid crystal panel of the first embodiment of this invention.

An expanded cross-sectional view of the liquid crystal panel 1 is shown in FIG. 3. The main liquid crystal panel unit 10 is provided with a first substrate 11, a plurality of segment electrodes (first electrodes) 12, a liquid crystal layer 13, a plurality of common electrodes (second electrodes) 14, and a second substrate 15. The first and second substrates 11 and 15 are formed of a transparent material; they could be formed from glass of a refractive index 1.5, by way of example. The plurality of segment electrodes 12 and the common electrodes 14 are also formed of transparent material, with the plurality of common electrodes 14 extending along the second substrate 15 in a single direction and the plurality of segment electrodes 12 extending along the first substrate 11 in another direction perpendicular to that single direction. It should be noted, however, that a single common electrode could be formed over substantially the entire surface of the second substrate. The first substrate 11 and second substrate 15 are disposed parallel to one another in such a manner that the plurality of segment electrodes 12 and the common electrodes 14 face each other, and the liquid crystal layer 13 is injected between these two substrates. The spacing of the first and second substrates 11 and 15 is preferably 3 to 20 $\mu$m.

Note that a seal member 28 forms a seal between the outer edges of the first substrate 11 and the second substrate 15, to prevent the liquid crystal layer 13 from leaking. The mutually opposing surfaces of the first substrate 11 and the second substrate 15 are subjected to orientation processing. In addition, the surface of the first substrate 11, in other words, the surface on the outer side facing the viewer, is preferably subjected to anti-reflective processing or non-glare processing, to greatly improve the visibility.

The liquid crystal layer 13 used by the main liquid crystal panel unit 10 is of a polymer dispersion type, which has the characteristic of turning transparent in regions in which no voltage is applied, but causes light to diffuse or scatter in regions in which a voltage is applied. In other words, if a voltage that is equal to or more than the threshold voltage of the liquid crystal is applied between the segment electrodes 12 and the common electrodes 14, white or gray is seen by the user and thus the day-of-the-week display "mo" and the date display "12–24" are made visible.

The method of fabricating the liquid crystal layer 13 is described below. First of all, a mixed liquid in which polymers or polymer precursors and the crystal are dissolved is injected between the first and second substrates 11 and 15. The liquid crystal and the polymers are then separated. This orientates the liquid crystal and the polymers with respect to each other within the liquid crystal layer 13. Note that this oriented state could be one in which particles or combined particles of polymers are distributed within the liquid crystal, or one in which the polymers are in a mesh-like gel state within the liquid crystal. It could also be an oriented state in which droplets of the liquid crystal are distributed within the polymers.

Vinyl compounds such as acrylate; compounds that can be polymerized by light or electron beams, such as epoxy compounds; or compounds that can be polymerized by heat, such as epoxy compounds; could be used as the above polymer precursors, in addition to methacrylates such as biphenyl methacrylate. Compounds that are polymerized by light or electron beams are illuminated with light of a suitable wavelength or an electron beam, to separate them from the liquid crystal. Compounds that are polymerized by heat are heated to an appropriate temperature to separate them from the liquid crystal.

Thermoplastic polymers such as ethyl cellulose could be used. In such a case, if the polymers and the liquid crystal are dissolved in a heated state, separation will occur on cooling.

Note that a chiral component could be included within the liquid crystal components. This would scatter light effectively, thus making the display within the liquid crystal more easily visible. Any ordinary chiral component could be used as the chiral component in this embodiment, provided it can exert a twisting power on the orientation of the liquid crystal.

As an example, 90% by weight of a main liquid crystal component (product name: BL007, made by Merck KGaA), 3% by weight of a chiral component (product name: CB15, made by Merck KGaA), and 7% by weight of a polymer precursor (biphenyl methacrylate) were mixed together and injected between the substrates 11 and 15. Ultraviolet light was then shone onto this mixed liquid, so that phase separation occurred with the liquid crystal and the polymers mutually orientated. This formed the liquid crystal layer 13. The thus fabricated liquid crystal panel had a drive voltage of approximately 5 V, so that this panel can sufficiently be driven by an IC for a prior-art timepiece.

Note that if liquid crystal having a positive anisotropy of dielectric constant is used, the opposing surfaces of the first and second substrates 11 and 15 are preferably processed to have a homogeneous alignment. If liquid crystal having a negative anisotropy of dielectric constant is used, the opposing surfaces of the first and second substrates 11 and 15 are preferably processed to have a homeotropic alignment.

The liquid crystal layer 13 in the resultant main liquid crystal panel unit 10 has the property of being transparent when no electrical field is applied, but light is diffused thereby when an electrical field is applied. Therefore, if an electrical field is applied between the segment electrodes 12 and the common electrodes 14, the portion therebetween appears to the user to be colored, which makes the above described display visible, as shown in FIG. 2. Portions where the electrical field is not applied are transparent, so that the analog display expressed by the dial plate 22 and the hands 24, 25, and 26 can be seen therethrough.

The color of this colored display is white or gray (although it should be noted that this invention is not to be taken as being limited to white). To emphasize the liquid crystal panel that appears as white or gray, the dial plate 22 is preferably of a color that has a low brightness, such as black, dark blue, or dark red.

Alternatively, the dial plate 22 is preferably reflective. In such a case, the reflected light amplifies the scattering within the liquid crystal display portions, which applies contrast between the display of the liquid crystal and the other portions, and thus makes the display more obvious. It is particularly suitable to apply a mirror surface to the dial plate 22.

As shown in FIG. 3, a single transparent layer 21 is formed in direct contact with the rear surface of the second substrate 15 of the main liquid crystal panel unit 10.

The basic concept of the display provided by the liquid crystal panel 1 having this transparent layer 21 will now be described. The description first concerns a case in which an electrical field is applied to the liquid crystal layer 13 between the segment electrodes 12 and the common electrodes 14.

In this case, light that is incident from the direction of the arrow A is scattered within the region of the liquid crystal layer 13 to which the voltage is applied. This scattered light comprises forward-scattered light B that continues forward in the light-incident direction A and backward-scattered light C that is scattered backward with respect to the light-incident direction A, as shown in FIG. 3. With this liquid crystal layer 13 in particular, research by the present inventors has determined that the quantity of forward-scattered light B tends to be greater than that of the backward-scattered light C.

The backward-scattered light C strikes the eyes of the observer directly, through the first substrate 11 and the ultraviolet-blocking film 20, but the forward-scattered light B does not reach the eyes of the observer, unless it is reflected back.

The transparent layer 21 is provided to ensure that this embodiment causes the large quantity of forward-scattered light B to be reflected. More specifically, part of the forward-scattered light B passes through the transparent layer 21, but the remainder is reflected at the boundary surface between the second substrate 15 and the transparent layer 21 so that it returns towards the front. Part of the forward-scattered light B that has passed through the transparent layer 21 proceeds onwards towards the outer air, but the remainder is reflected at the boundary surface between the transparent layer 21 and the air so that it returns towards the front. The degree of scattering of the light from the liquid crystal layer 13 that strikes the eyes of the observer is increased by the thus-reflected forward-scattered light B, making the display shown on the liquid crystal panel even brighter and thus making it clearly visible.

If the light reflected from the transparent layer 21 is sufficient, therefore, the display of the liquid crystal layer 13 can be made more conspicuous and thus clearly visible, even if the dial plate 22 is of a low brightness.

In a configuration in which there is a single transparent layer 21, the refractive index of the transparent layer 21 is preferably made larger than the refractive index of the second substrate 15. In other words, it is preferable that the relationship expressed by Equation 1-1 is satisfied, and more preferable that the relationship of Equation 1-2 is satisfied.

$$n_0 < n_1 \quad \text{(Equation 1-1)}$$

$$n_2 < n_0 < n_1 \quad \text{(Equation 1-2)}$$

where: $n_0$ is the refractive index of the second substrate 15, $n_1$ is the refractive index of the transparent layer 21, and $n_2$ is the refractive index of air (value=1).

Ordinarily, more of the light incident from the front is reflected by the boundary surface between the second substrate 15 and the transparent layer 21 as the difference between the refractive index $n_0$ of the second substrate 15 and the refractive index $n_1$ of the transparent layer 21 on the rear side thereof increases, making it possible for the display shown by the light-scattering type of liquid crystal panel to be clearer and brighter. Similarly, more of the light incident from the front is reflected by the boundary surface between the transparent layer 21 and the air layer behind it as the difference between the refractive index $n_1$ of the transparent layer 21 and the refractive index $n_2$ of the air on the rear side thereof increases, making it possible for the display shown by the light-scattering type of liquid crystal layer 13 to be clearer and brighter. Furthermore, very little of the light incident from the air at the rear is reflected by the boundary surface between the transparent layer 21, which has a large refractive index, and the second substrate 15, which has a small refractive index, so this also makes it possible for the display shown by the light-scattering type of liquid crystal layer 13 to be clearer and brighter.

Conversely, if the refractive index of the transparent layer 21 is made to be smaller than the refractive index of the second substrate 15, the difference between the refractive indices of the transparent layer 21 and the air layer on the rear side thereof is reduced, so that the effect of light incident from the front being reflected by the boundary surface between the transparent layer 21 and the air layer is reduced. In addition, more of the light incident from the air layer at the rear is reflected by the boundary surface between the transparent layer 21, which has a small refractive index, and the second substrate 15, which has a large refractive index.

It should be noted, however, that the reflectance is not always increased, depending on the relationship between the light wavelength A and the optical film thickness $n_1 \cdot d_1$ of the transparent layer 21, even if the refractive index of the transparent layer 21 is large. This point will now be discussed with reference to FIG. 4 and Equations 2 and 3.

$$n_1 \cdot d_1 = (2m+1) \lambda/4 \quad \text{(Equation 2)}$$

$$n_1 \cdot d_1 = (m+1) \lambda/2 \quad \text{(Equation 3)}$$

Figure 4:
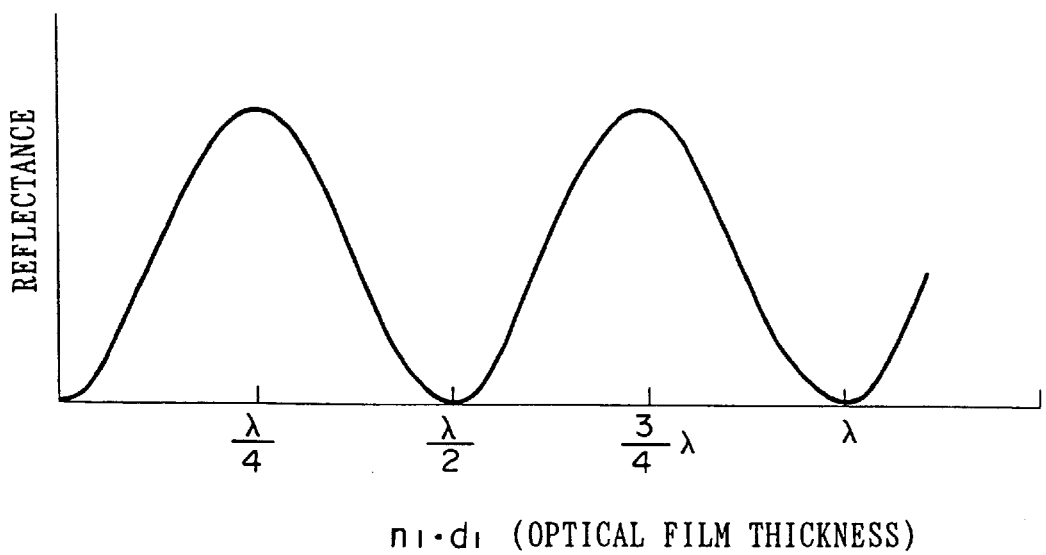
FIG. 4 is a graph of the relationship between the optical film thickness and reflectance of the transparent layers used in the liquid crystal panel of the first embodiment.

As can be seen from FIG. 4, reflectance increases when the relationship is as stated by Equation 2, or is close thereto, but the increasing rate of the reflectance is reduced when the relationship is as stated by Equation 3, or is close thereto. In this case, $n_1$ is the refractive index of the transparent layer 21, $d_1$ is the thickness of the transparent layer 21, $\lambda$ is the wavelength of light, and m is an integer greater than or equal to zero (0,1,2, . . . ).

Examples given below are those of combinations of the second substrate 15 and the transparent layer 21 that satisfy the above relationship that the refractive index of the transparent layer 21 should be greater than the refractive index of the second substrate 15.

(1) If the second substrate 15 is formed of ordinary glass (refractive index 1.5), of which the main component is $SiO_2$, suitable materials for the transparent layer 21 would include: $NdF_3$ (refractive index 1.61), $CeF_3$ (refractive index 1.63), $PbF_2$ (refractive index 1.75), ZnS (refractive index 2.3), CdS (refractive index 2.5 (0.6 μm)), ZnSe (refractive index 2.57 (0.6 μm)), ZnTe (refractive index 2.8), $Sb_2S_3$ (refractive index 3.0), PbTe (refractive index 5.6 (5.0 μm)), Si (refractive index 3.4 (3.0 μm)), Ge (refractive index 4.4 (2.0 μm)), $SnO_2$ (refractive index 1.9), SiO (refractive index 2.0 (0.7 μm)), $Al_2O_3$ (refractive index 1.6), MgO (refractive index 1.7), $ThO_2$ (refractive index 1.86), $La_2O_3$ (refractive index 1.9), $CeO_2$ (refractive index 2.2), $ZrO_2$ (refractive index 2), $Ta_2O_5$ (refractive index 2.1), $TiO_2$ (refractive index 1.9), PbO (refractive index 2.6), and ITO (refractive index 1.8). Note that the values in parentheses after each refractive index give the wavelength at which that refractive index was measured, and this wavelength is 0.55 μm if no value is given in parentheses.

(2) If the second substrate 15 is formed of sapphire glass ($Al_2O_3$ (refractive index 1.6)), suitable materials for the transparent layer 21 would be any of the above list of materials that have refractive indices greater than 1.6.

By utilizing the relationships described in relation to the above Equations 2 and 3, light of a special wavelength could be reflected toward mainly the front side, or light over all wavelengths could be reflected toward the front side.

The common electrodes 14 formed on the front surface of the second substrate 15 could be made of the same material as that of the transparent layer 21 formed on the rear surface of the second substrate 15. If this is so, the formation of films on the front and rear surface of the second substrate 15 could be done by the same film-formation apparatus, improving the throughput. Since it is necessary to form the second electrodes of a transparent electrode material in such a case, the transparent layer 21 can also be formed of that transparent electrode material. This transparent material could be tin oxide ($SnO_2$) or indium tin oxide (ITO), or the like. Of these materials, tin oxide is particularly useful because tin oxide has a greater refractive index than other transparent electrode materials and thus it can ensure a greater difference in refractive indices between the second substrate 15 and the air layer.

Note that the transparent layer 21 is not limited to being disposed in contact with the second substrate 15; an air layer could equally well be formed between the second substrate 15 and the transparent layer 21. In such a case, the optically transmissive medium in contact with the transparent layer 21 is an air layer, and light van be reflected from that interface. The transparent layer 21 should therefore be made of a material having a refractive index that differs from the refractive index of that air layer.

Second Embodiment

Figure 5:
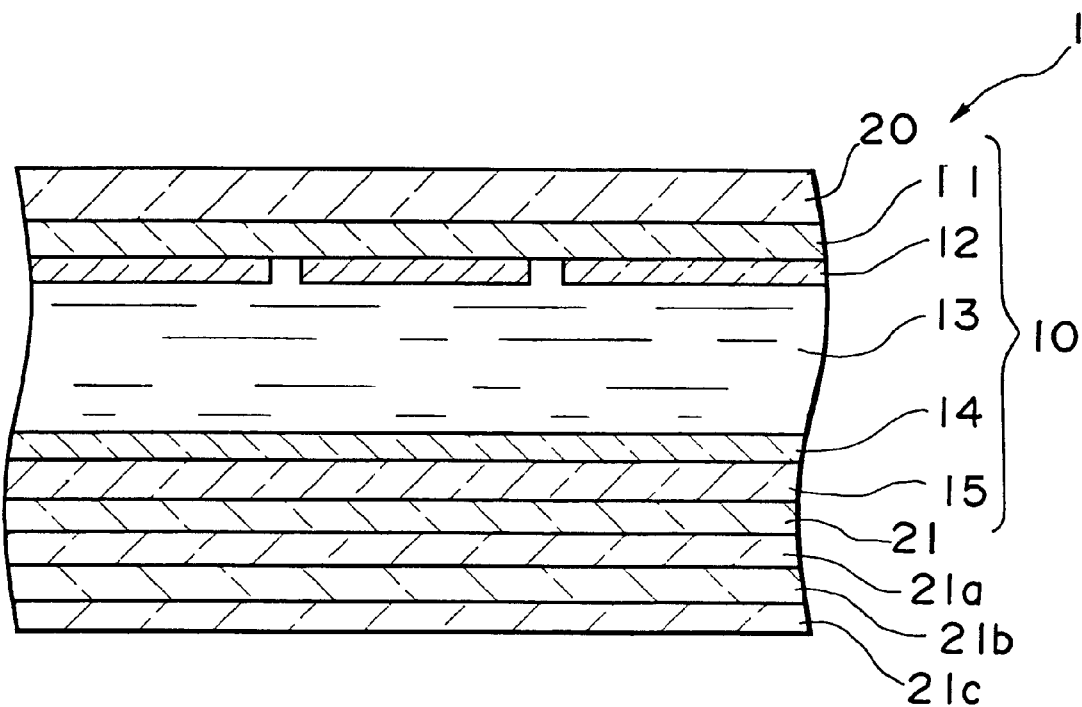
FIG. 5 is a cross-sectional view through a liquid crystal panel of a second embodiment of this invention.

In a second embodiment of the liquid crystal panel 1 of this invention, shown in FIG. 5, further transparent layers 21a, 21b, and 21c are provided below the transparent layer 21, and all of the transparent layers 21, 21a, 21b, and 21c are in direct contact. In this case, the refractive index of each transparent layer preferably differs from the refractive indices of the other transparent layers and the second substrate 15.

It is difficult to represent this configuration by a simple logical relationship such as Equation 1, but it is possible to cause repeated reflections at the boundary surfaces between the transparent layers, depending on the combination of refractive indices of the transparent layers, thus illuminating the display in the liquid crystal layer 13 more brightly.

Third Embodiment

Figure 6:
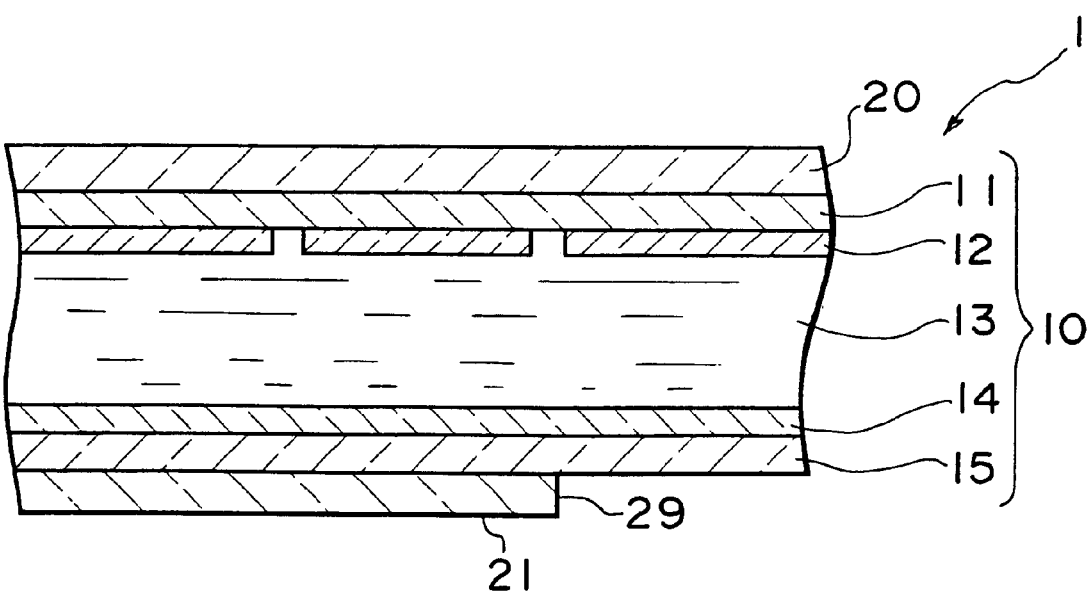
FIG. 6 is a cross-sectional view through a liquid crystal panel of a third embodiment of this invention.

A third embodiment of the liquid crystal panel 1 in accordance with this invention is shown in FIG. 6. Although the transparent layer 21 is provided over substantially the entire rear surface of the second substrate 15 in the liquid crystal panel 1 of the first embodiment, in this embodiment the transparent layer 21 is attached in correspondence with a part of the rear surface of the second substrate 15.

This configuration provides the effect of illuminating brightly only a part of the liquid crystal layer 13 corresponding to the region in which the transparent layer 21 and the second substrate 15 are superimposed. In contrast, this effect is not achieved in a portion of the liquid crystal layer 13 corresponding to a region in which the transparent layer 21 is not formed. Therefore, the viewer gets the feeling that the former portion is a strongly contrasting display, whereas the latter portion is a weakly contrasting display. This can be used to create different impressions depending on display position.

Figure 7:
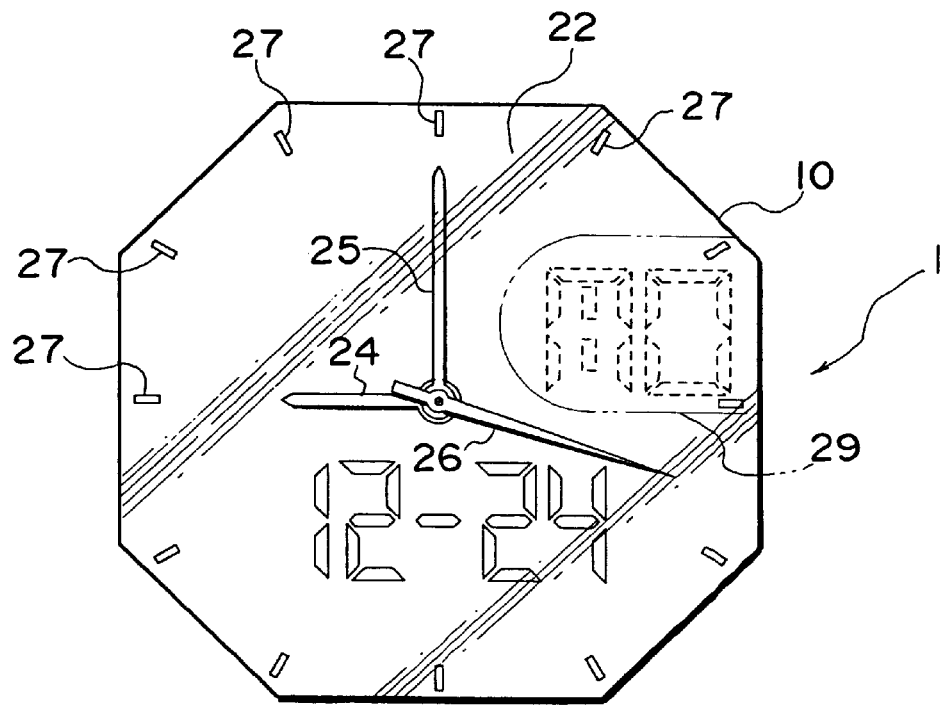
FIG. 7 is a front view of essential components relating to an example of this third embodiment.

A front view of essential components of a timepiece that uses the liquid crystal panel 1 of FIG. 6 is shown in FIG. 7. An edge border 29 of the transparent layer 21 of FIG. 6 is located around the day-of-the-week display shown in FIG. 7. More specifically, the day-of-the-week display portion that shows "mo" is a portion that does not correspond to the transparent layer 21 but the date display portion that shows "12–24" is a portion that does correspond to the transparent layer 21. Thus the date display can be made clearly visible in comparison with the day-of-the-week display. This kind of display can be used in many other ways.

Figure 8:
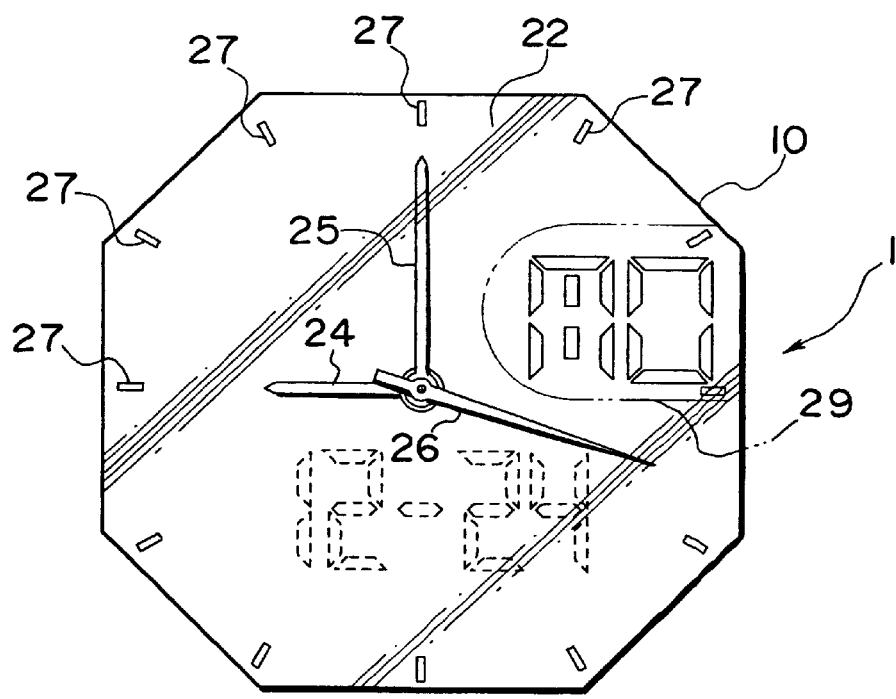
FIG. 8 is a front view of essential components relating to another example of this third embodiment.

Another example of the use of the liquid crystal panel 1 of FIG. 6 is shown in FIG. 8. The display in FIG. 8 is opposite to that of FIG. 7 in that the day-of-the-week display portion that shows "mo" is a portion that does correspond to the transparent layer 21 but the date display portion that shows "12–24" is a portion that does not correspond to the transparent layer 21. Thus the day-of-the-week display can be made clearly visible in comparison with the date display.

Fourth Embodiment

Figure 9:
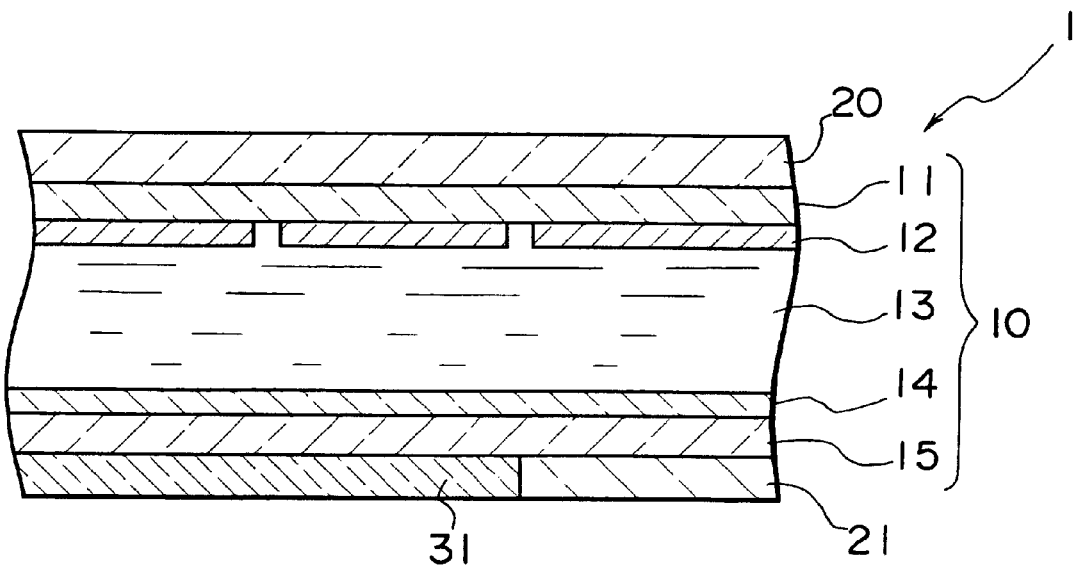
FIG. 9 is a cross-sectional view through a liquid crystal panel of a fourth embodiment of this invention.

A fourth embodiment of the liquid crystal panel 1 in accordance with this invention is shown in FIG. 9. In the liquid crystal panel 1 of this fourth embodiment, the transparent layer 21 is attached in correspondence with a part of the rear surface of the second substrate 15, whereas another transparent layer 31 is attached in correspondence with another part thereof. The refractive indices of the transparent layers 21 and 31 are different from each other. In other words, transparent layers 21 and 31 formed of materials having different refractive indices are disposed on the same flat surface in this embodiment.

With this embodiment, the impression of the display portion of the liquid crystal layer 13 corresponding to the transparent layer with the larger refractive index can be made different from the impression of the display portion of the liquid crystal layer 13 corresponding to the transparent layer with the smaller refractive index. This enables various different displays, such as those shown in FIG. 7 or FIG. 8.

Fifth Embodiment

Figure 10:
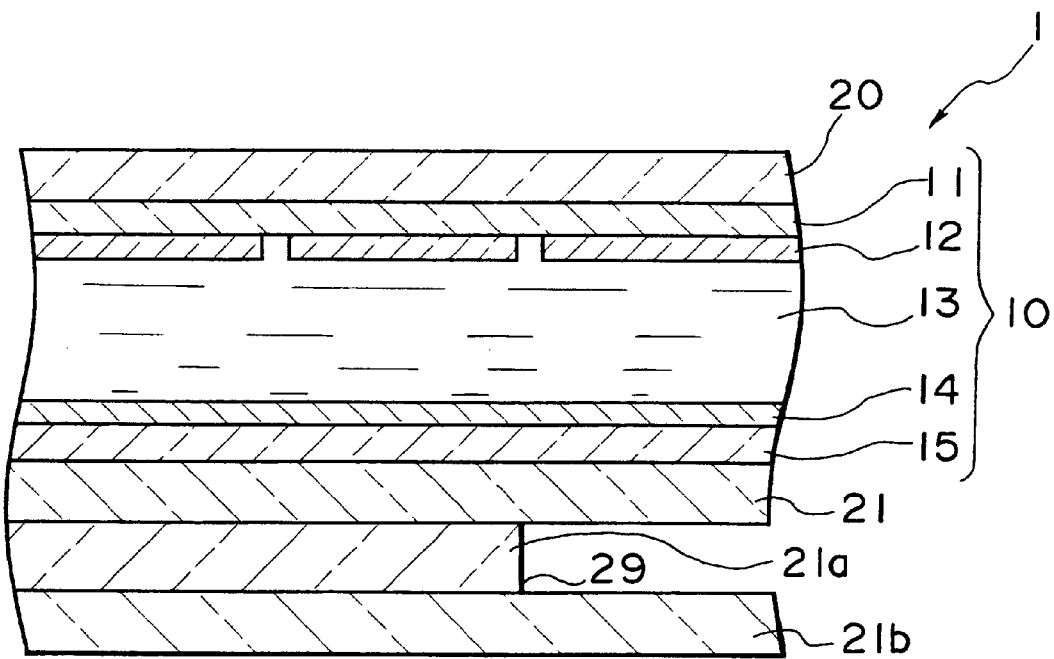
FIG. 10 is a cross-sectional view through a liquid crystal panel of a fifth embodiment of this invention.

A fifth embodiment of the liquid crystal panel 1 in accordance with this invention is shown in FIG. 10. In the liquid crystal panel 1 of this fifth embodiment, a plurality of the transparent layers 21, 21a, and 21b are provided in a stack, in the same manner as in the second embodiment of FIG. 5. In addition, the transparent layer 21a corresponds to only a part of the other transparent layers 21 and 21b and is attached thereto. Reference number 29 in this figure denotes an edge border of the transparent layer 21a, and is equivalent to the edge border 29 of FIGS. 7 and 8.

With this embodiment, the display portion of the liquid crystal layer 13 corresponding to the three transparent layers 21, 21a, and 21b can be made to give a different impression from that of the display portion of the liquid crystal layer 13 corresponding to the two transparent layers 21 and 21b alone. This enables various different displays, such as those shown in FIG. 7 or FIG. 8. Note that the number of transparent layers is not limited to that shown in the figure, and any of the transparent layers can be formed to be smaller, as shown by the transparent layer 21a in the figure.

It should also be noted that transparent layers formed of materials having different refractive indices could be disposed on the same flat surface, if a plurality of such transparent layers are provided, in the same manner as the third embodiment shown in FIG. 9.

Sixth Embodiment

Figure 11:
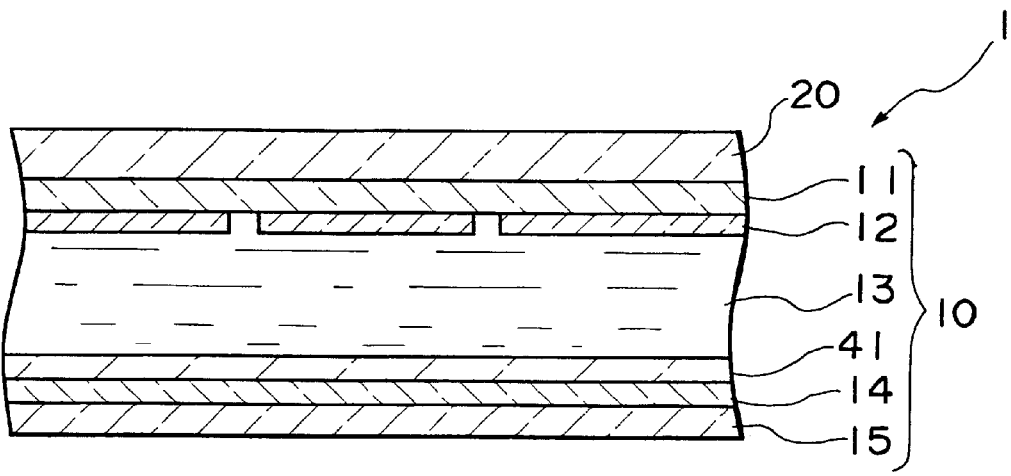
FIG. 11 is a cross-sectional view through a liquid crystal panel of a sixth embodiment of this invention.

A sixth embodiment of the liquid crystal panel 1 in accordance with this invention is shown in FIG. 11. In the liquid crystal panel 1 of this sixth embodiment, a transparent layer 41 is disposed between the polymer dispersion type of light-scattering liquid crystal layer 13 and the second substrate 15. In this case, a plurality of common electrodes 14 are formed at a suitable spacing on the second substrate 15. Thus the transparent layer 41 is formed to cover the plurality of common electrodes 14 in the portions in which the common electrodes 14 are provided. The transparent layer 41 is formed over the second substrate 15 in portions in which there are no common electrodes 14. This transparent layer 41 is formed of an insulating material, to prevent shorting between adjacent common electrodes 14.

During the fabrication of this liquid crystal panel 1, the transparent layer 41 is previously formed over the surfaces of the second substrate 15 and the common electrodes 14, then the first substrate 11 and the second substrate 15 are linked together.

Assume in this case that the material of the transparent layer 41 of this sixth embodiment is $Al_2O_3$ (refractive index 1.6), the material of the common electrodes 14 is $SnO_2$ (refractive index 1.9), and the material of the second substrate 15 is $SiO_2$ (refractive index approximately 1.5).

With the above configuration, light that is incident from the front side and has passed through the transparent layer 41 is reflected as described below. In other words, part of this through light is reflected by each of the boundary surface between the transparent layer 41 and the plurality of common electrodes 14, the boundary surface between the plurality of common electrodes 14 and the second substrate 15, and the boundary surface between the transparent layer 41 and the second substrate 15, and returns towards the front side. Part of the light that has passed through the second substrate 15 proceeds onwards towards the air, but the remainder is reflected by the boundary surface between the second substrate 15 and the air and returns towards the front side.

In this case, the area occupied by the plurality of common electrodes 14 formed on the second substrate 15 is greater than total surface area over which no common electrodes 14 are formed, from considerations of ensuring a sufficiently high aspect ratio. Therefore, with this sixth embodiment, the total surface area of the boundary surface between the plurality of common electrodes 14 and the second substrate 15 is greater than the total surface area of the boundary surface between the transparent layer 41 and the second substrate 15.

Since there is thus a large difference in refractive indices (1.9−1.5=0.4) at the wide boundary surface between the common electrodes 14 and the second substrate 15, reflectance at that boundary surface is increased. Note that the total surface area of the boundary surface between the transparent layer 41 and the plurality of common electrodes 14 can also be guaranteed to be large, so that large amounts of reflection can be expected here too. It is therefore better to chose materials with a large difference in refractive indices at the boundary surface between the transparent layer 41 and the plurality of common electrodes 14.

The light that has been reflected in this manner ensures that the display shown by the light-scattering liquid crystal layer 13 can be made bright and is thus clearly visible.

Note that the common electrodes 14 could be provided on the rear surface of the first substrate 11 with the segment electrodes 12 being provided on the front surface of the second substrate 15, as a variation on the above configuration. In such a case too, it is preferable that the transparent layer 41 is formed of an insulating material. If the transparent layer 41 were formed of a conductive material in such a case, an electrical field would be generated between the common electrodes 14 and the transparent layer 41 in contact with the segment electrodes 12, making it impossible to show any display at locations corresponding to the segment electrodes 12.

Seventh Embodiment

Figure 12:
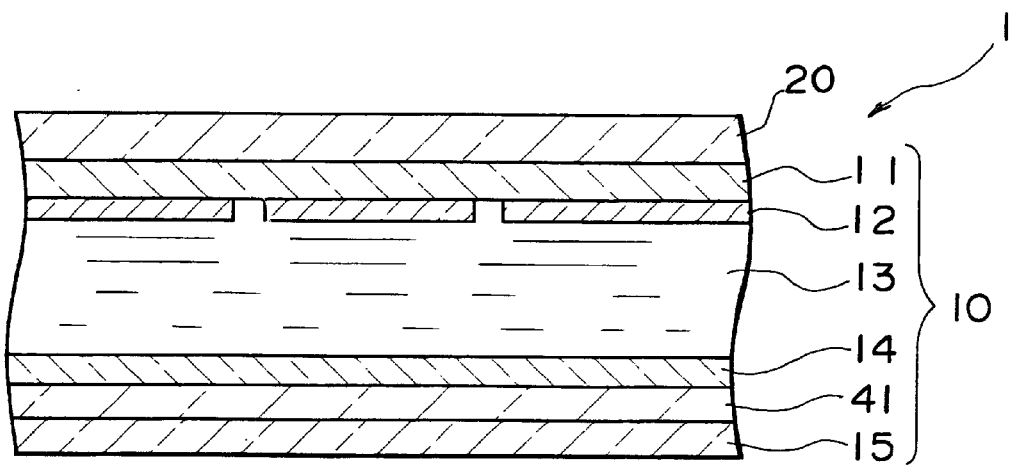
FIG. 12 is a cross-sectional view through a liquid crystal panel of a seventh embodiment of this invention.

A seventh embodiment of the liquid crystal panel 1 in accordance with this invention is shown in FIG. 12. In the liquid crystal panel 1 of this seventh embodiment, an insulating transparent layer 41 is formed on the front side of the second substrate 15 and the common electrodes 14 are then formed thereupon. Other details are the same as those of the sixth embodiment of FIG. 11.

Assume in this case that the material of the transparent layer 41 of this seventh embodiment is $TiO_2$ (refractive index 1.9), the material of the common electrodes 14 is ITO (refractive index 1.8), and the material of the second substrate 15 is $SiO_2$ (refractive index approximately 1.5).

With the above configuration, light that is incident from the front side and has passed through the transparent layer 41 is reflected as described below. In other words, part of this through light is reflected by each of the boundary surface between the transparent layer 41 and the plurality of common electrodes 14 and the boundary surface between the transparent layer 41 and the second substrate 15, and returns towards the front side. Part of the light that has passed through the second substrate 15 proceeds onwards towards the air, but the remainder is reflected by the boundary surface between the second substrate 15 and the air and returns towards the front side.

The widest reflective surface that can be ensured in this seventh embodiment is the boundary surface between the transparent layer 41 and the second substrate 15, and this embodiment ensures that there is a large difference in refractive indices (1.9−1.5=0.4) at that boundary surface.

The light that has been reflected in this manner makes it possible for the display shown by the light-scattering liquid crystal layer 13 to be bright and is thus clearly visible.

Note that the common electrodes 14 could be provided on the rear surface of the first substrate 11 with the segment electrodes 12 being provided on the front surface of the second substrate 15, as a variation on the above configuration. In this case too, the transparent layer 41 is preferably formed of an insulating material.

In the above sixth and seventh embodiments, the refractive index of the second substrate is preferably made to be larger than the refractive indices of the transparent layer 41 and air, to increase the reflectance at the boundary surface between the second substrate 15 and the air. To satisfy the relationship of Equation 1-1, therefore, reference numbers no and $n_1$ could be defined as shown below, in other words, $n_0$ in Equation 1-1 is the refractive index of the transparent layer 41 and $n_1$ is the refractive index of the second substrate 15. If $n_1$ is the refractive index of the second substrate 15 and $d_1$ if the thickness of the second substrate 15, the relationships described with reference to FIG. 4 and Equations 2 and 3 can be satisfied.

With such a configuration, the scattering at the liquid crystal layer 13 that reaches the eyes of the observer is further increased. This makes it possible for the display provided by the light-scattering liquid crystal layer 13 to be even more clearly visible.

If the second substrate 15 is made of a glass which always has $SiO_2$ as a main component (refractive index 1.5), there are few materials for the transparent layer 41 that satisfy these conditions, but if the second substrate 15 is made of $Al_2O_3$ (refractive index 1.6), $SiO_2$ can be used for the transparent layer 41.

Eighth Embodiment

Figure 13:
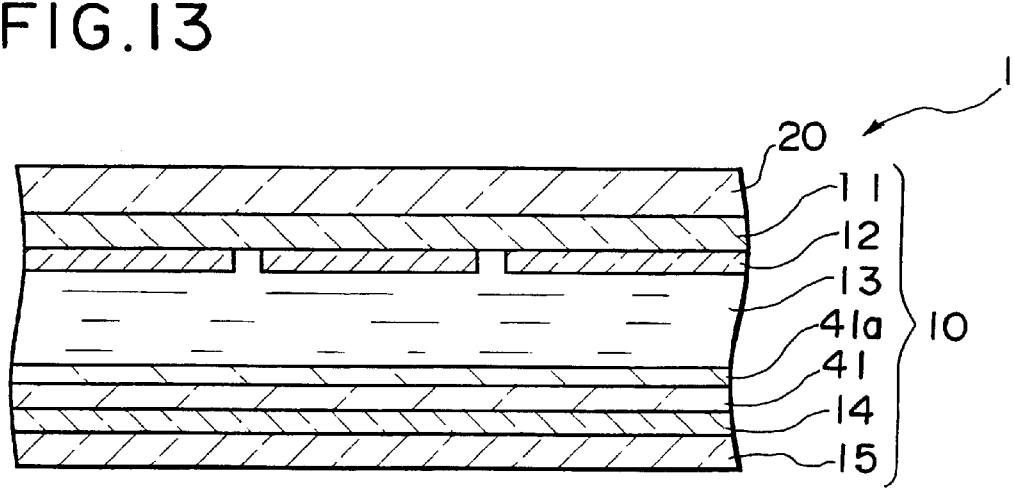
FIG. 13 is a cross-sectional view through a liquid crystal panel of an eighth embodiment of this invention.

An eighth embodiment of the liquid crystal panel 1 in accordance with this invention is shown in FIG. 13. In the liquid crystal panel 1 of this eighth embodiment, a transparent layer 41a having a different refractive index is superimposed on the front side of the transparent layer 41.

It is difficult to represent this configuration by a simple logical relationship such as Equation 1-1, but reflections can be repeated at each of the boundary surfaces between the transparent layers 41 and 41a, the common electrodes 14, and the second substrate 15, depending on the combinations of refractive indices of the transparent layers, thus enabling a clearer and brighter display from the light-scattering liquid crystal layer 13. There can be any number of transparent layers, provided the electrical field that is generated between segment electrodes 12 and the common electrodes 14 is not impeded thereby.

Note that it is possible to impart different impressions depending on display position with the sixth or eighth embodiment too, by providing a partial transparent layer in a manner similar to that of the third embodiment of FIG. 6, by providing transparent layers of differing refractive indices on the same flat surface in a manner similar to that of the fourth embodiment of FIG. 9, or by providing partial transparent layers in a manner similar to that of the fifth embodiment of FIG. 10.

Ninth Embodiment

Figure 14:
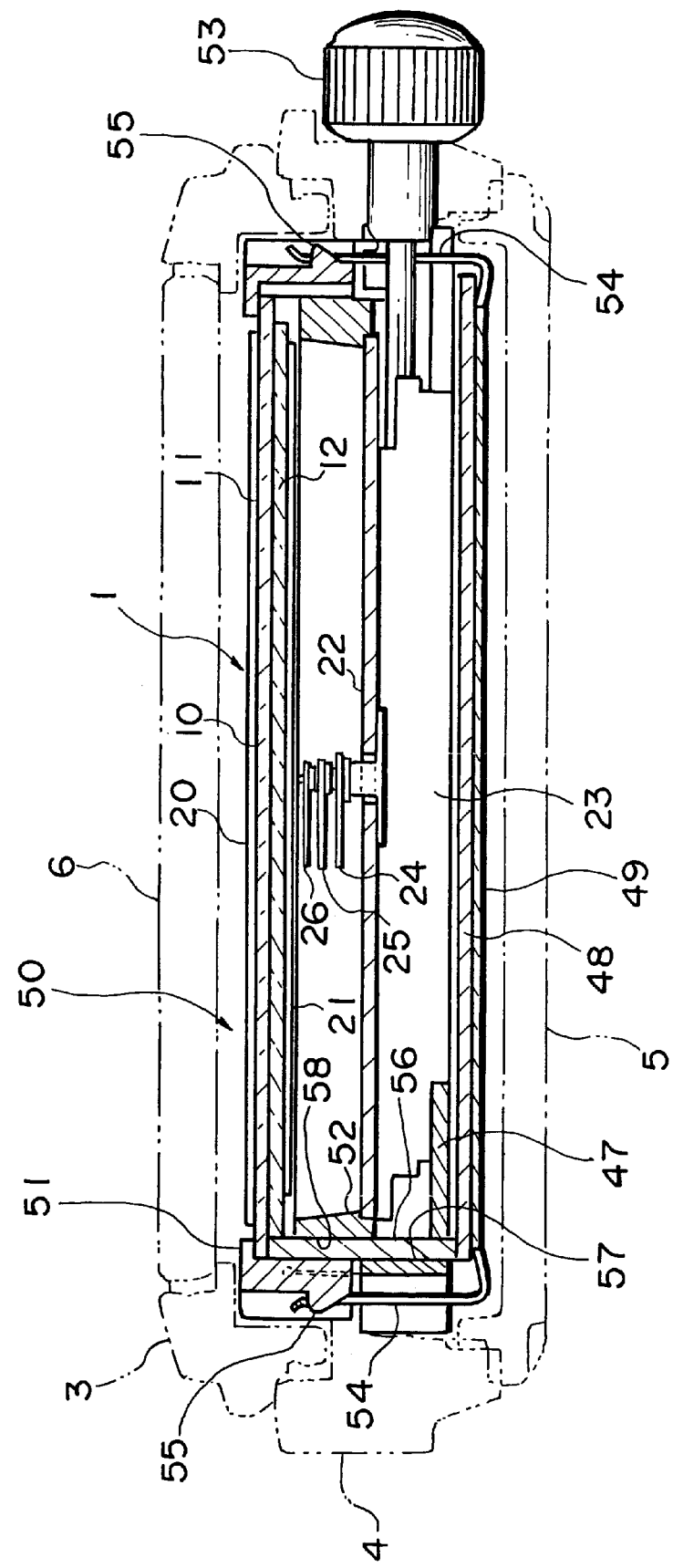
FIG. 14 is a cross-sectional view through a two-layer display type of timepiece relating to a ninth embodiment of this invention.

A specific example of the use of the liquid crystal panel 1 of the first to eighth embodiments, in a two-layer display type of timepiece will now be described with reference to FIGS. 14 and 15.

This liquid crystal panel 1 is held by an annular outer panel frame 51 and an annular panel restraining member 52 that fits into the outer panel frame 51, and the liquid crystal panel 1, the outer panel frame 51, and the panel restraining member 52 together form a panel unit 50.

A watch stem 53 is attached to the casing 23 of the analog movement, extending in a sideways direction. The casing 23 is mounted into a circuit case 47 made of resin. A circuit board 48 is attached to a rear side of the circuit case 47 and a metal circuit pressing plate 49 is attached to the rear side thereof.

Figure 15:
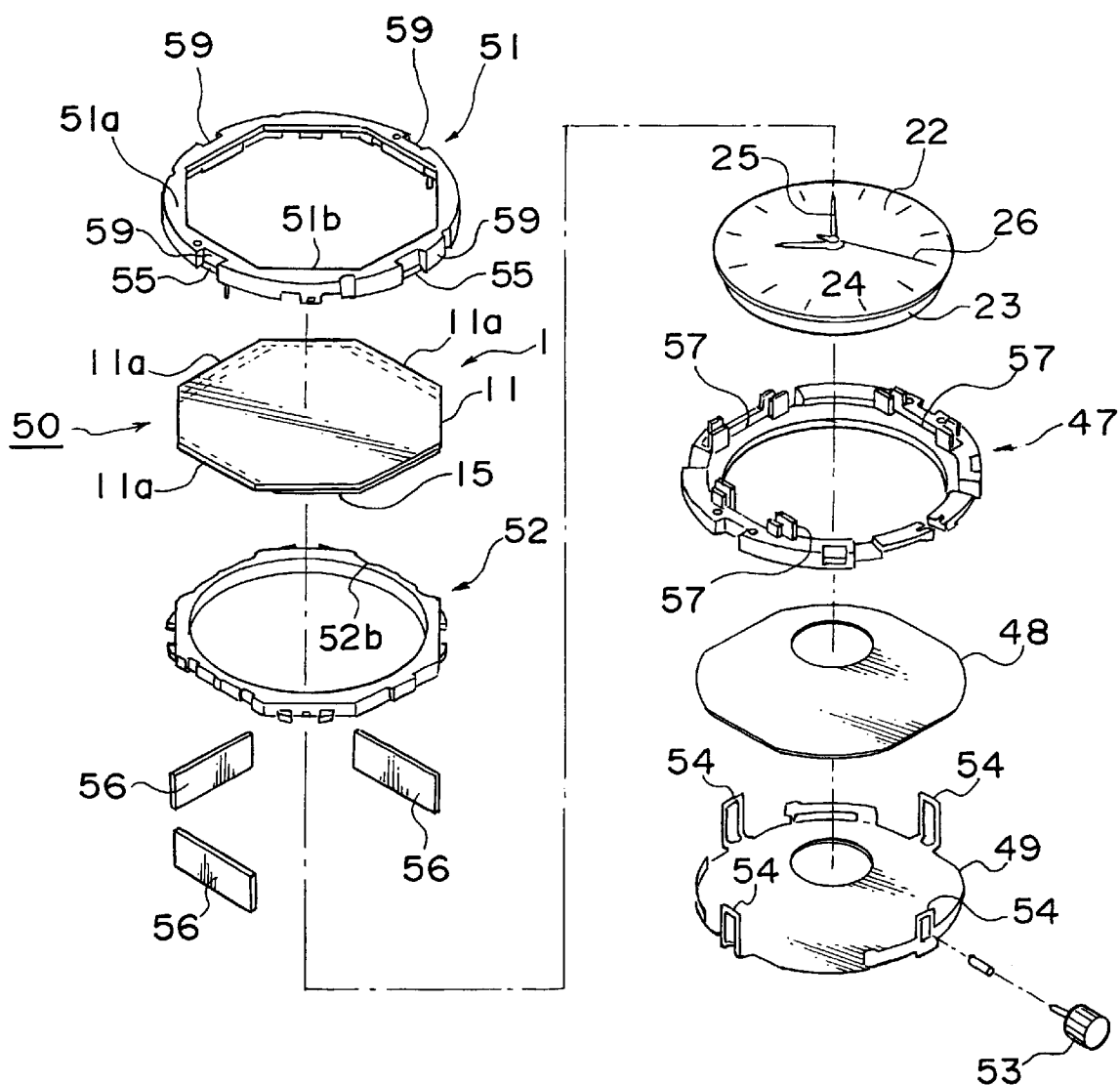
FIG. 15 is an exploded perspective view of the two-layer display type of timepiece of FIG. 14.

Four hooks 54 are formed around an edge portion of the circuit pressing plate 49, as shown in FIG. 15, and these hooks 54 are bent upward. Engagement pieces 55 are provided protruding outward from four locations on the outer periphery of the outer panel frame 51, to correspond to the four hooks 54. The panel unit 50 is mounted on the circuit pressing plate 49 with the circuit case 47 and the circuit board 48 sandwiched therebetween, by engaging the hooks 54 into the corresponding engagement pieces 55.

Note that grooves 59 are provided at four locations at 90 degrees around the outer peripheral surface of the outer panel frame 51, as shown in FIG. 15. The four grooves 59 are formed along the axial direction of the outer panel frame 51 and the engagement pieces 55 protrude into the centers of these grooves 59.

A storage compartment for a battery (not shown in the figure) is provided in the circuit case 47. One terminal of this battery is connected to the circuit pressing plate 49 and the other terminal thereof is connected to a terminal of circuitry provided on the circuit board 48. The analog movement is supplied with power by the circuit board 48 supported by the circuit pressing plate 49.

A circuit for supplying power to the liquid crystal panel 1 is also formed on the circuit board 48. Reference number 56 denotes zebra connectors that are connected to the liquid crystal panel 1 and the circuitry on the circuit board 48. Three of these zebra connectors 56 are provided, as shown in FIG. 15. These zebra connectors 56 are retained by retaining apertures 57 of the circuit case 47, as shown in FIG. 14, passing through corresponding through holes 58 formed between the outer panel frame 51 and the panel restraining member 52. Each of the zebra connectors 56 has a thin-plate form and includes an insulating and elastic main body, in which are provided condustors as a plurality of conductive paths at predetermined locations. Circuit terminals on the circuit board 48 are connected to terminals of the liquid crystal panel 1 by these conductive paths.

The internal structure of this timepiece is covered by an upper case 3, a lower case 4, a rear cover 5, and a protective glass 6 on the front side that also provide external protection, so that only the operational portion of the watch stem 53 is exposed.

Note that the first substrate 11 and the second substrate 15 of the liquid crystal panel 1 are formed to have an octagonal shape and are superimposed as shown in FIG. 15. The first substrate 11 is formed to be slightly bigger than the second substrate 15 so that, when the two substrates are superimposed, parts of the substrate 11 in front protrude further outward than the second substrate 15. Three such extended portions 11a are provided, the terminals of the liquid crystal panel 1 are formed or the rear sides of these extended portions 11a, and these terminals are connected to the conductive paths formed in the zebra connectors 56.

The profile of the inner side of the panel restraining member 52 is of a circular ring shape as shown in FIG. 15 and this member is formed of resin. The profile 52b of the outer side of the panel restraining member 52 is formed to resemble an octagonal shape such that it fits the outer panel frame 51.

During the assembly of this two-layer display type of timepiece, the liquid crystal panel 1 is incorporated into the panel unit 50. At this point, the liquid crystal panel 1 has a configuration such that the ultraviolet-blocking film 20 is attached to the surface of the main liquid crystal panel unit 10 and the transparent layer 21 is attached to the rear surface thereof, and the ultraviolet-blocking film 20 or the transparent layer 21 are extremely prone to damage, depending on the materials thereof. However, such defects can be prevented by handling the assembly as the panel unit 50.

Once the liquid crystal panel 1 is sandwiched between the outer panel frame 51 and the panel restraining member 52, however, the panel 1 is held away from the surface of the worktable, for example, even if the panel unit 50 is placed directly thereon. This makes it possible to reduce the danger of damage to the panel 1.

Further Variations

To make the white or gray information display on the liquid crystal layer 13 more conspicuous, a transparent layer having a high refractive index could be provided on the dial plate 22 by means such as vapor deposition, in addition to forming a mirror surface for the dial plate 22. In this case, a plurality of such transparent layers could be superimposed. The dial plate 22 could also be of a color of a low level of brightness, such as black.

A two-layer display type of electronic equipment in accordance with this invention is not limited to a timepiece provided with an analog display means that provides a display by the dial plate 22 and the hands 24, 25, and 26. For example, the background display portion provided behind the liquid crystal panel 1 could be such that the background can be seen through regions where the liquid crystal layer of the liquid crystal panel 1 are in a transmissive state. This background display portion could also be a board on which is formed a pattern drawn of letters and pictures. Alternatively, the background display portion could be another liquid crystal panel showing a second-layer liquid crystal display, which is provided on the rear surface side of the liquid crystal panel 1 which shows a first-layer liquid crystal display. The liquid crystal panel for the second-layer liquid crystal display could be a transmissive type provided with a backlight or a reflective type. If the background display portion is a backlit liquid crystal panel, the light from the backlighting can be guided towards the first-layer liquid crystal panel 1 on the front side thereof. Alternatively, an illumination light source could be provided between the liquid crystal panel 1 and the background display portion on the rear side thereof, so that light is generated from behind the liquid crystal panel 1. Light from the rear of the first-layer liquid crystal panel 1 would make the display of the liquid crystal panel 1 more clearly visible, without hindering it. In addition, if light is generated from behind this first liquid crystal panel 1, the background display portion on the rear side thereof will be visible without being affected by the amount of light that passes through the liquid crystal panel 1. The background display portion could also be configured of means for self-generating light from an electrical supply, such as an LED.

This two-layer display type of electronic equipment is not limited to a timepiece; it can be applied to various other types of electronic equipment in which two-layer displays are necessary, in addition to portable electronic devices such as calculators, electronic notebooks, and wireless pagers.

Note that the method of driving the electrodes of the liquid crystal panel 1 of the above embodiments is a static method, but the present invention is not limited thereto and a simple matrix method, a multiplexing method, or a thin-film transistor method could equally well be used therefor.

What is claimed is:

1. A liquid crystal panel comprising:
   a first substrate which is disposed on a side on which external light is incident and on which is formed at least one first electrode;
   a second substrate which is disposed facing said first substrate and on which at least one second electrode is formed;

a liquid crystal layer which is inserted between opposing surfaces of said first and second substrates and which operates in a light-transmitting state and a light-scattering state, based on a voltage applied between said at least one first electrode and said at least one second electrode; and at least one, transparent layer disposed between said liquid crystal layer and said at least one second electrode in a light-incident direction;

wherein said at least one transparent layer is formed of a material having a refractive index that differs from the refractive index of said at least one second electrode.

2. The liquid crystal panel as defined in claim 1, wherein when said liquid crystal layer has been set to said light-scattering state, the quantity of light scattered forward in said light-incident direction is greater than the quantity of light scattered backward against said light-incident direction.

3. The liquid crystal panel as defined in claim 2, wherein said liquid crystal layer is a polymer dispersed liquid crystal layer comprising liquid crystal and polymers.

4. The liquid crystal panel as defined in claim 1, wherein said at least one transparent layer is formed of a material selected from glass, polymer films, transparent electrode materials, and interference films.

5. The liquid crystal panel as defined in claim 1, wherein said at least one transparent layer is formed to be in contact with said second substrate.

6. The liquid crystal panel as defined in claim 5, wherein a first main surface of said at least one transparent layer is formed to be in contact with a surface on the opposite side of said second substrate from said opposing surface, wherein said at least one transparent layer is formed of a material having a different refractive index from the refractive index of said second substrate.

7. The liquid crystal panel as defined in claim 6, wherein said at least one transparent layer is formed of a material having a refractive index larger than the refractive index of said second substrate.

8. The liquid crystal panel as defined in claim 7, wherein a second main surface on the opposite side from said first main surface of said at least one transparent layer is formed to be in contact with an air layer; and wherein when the refractive index of said second substrate is $n_0$, the refractive index of said at least one transparent layer is $n_1$, and the refractive index of said air layer is $n_2$, the following relationship is established: $n_2 < n_0 < n_1$.

9. The liquid crystal panel as defined in claim 6, wherein said at least one second electrode is a transparent electrode; and wherein said at least one transparent layer is formed of the same material as the transparent electrode material that forms said at least one second electrode.

10. The liquid crystal panel as defined in claim 9, wherein said at least one transparent layer and said at least one second electrode are formed of tin oxide or indium tin oxide (ITO).

11. The liquid crystal panel as defined in claim 1, wherein said at least one transparent layer is formed on the opposite side of said second substrate from said opposing surface, with an air layer therebetween, and said at least one transparent layer is formed of a material having a refractive index that differs from the refractive index of said air layer.

12. The liquid crystal panel as defined in claim 1, wherein said at least one transparent layer is formed between said at least on second electrode and said second substrate, and is formed of a material having a refractive index different from the refractive indices of said at least one second electrode and said second substrate.

13. The liquid crystal panel as defined in claim 1, wherein said at least one transparent layer is formed on part of a flat surface region facing said liquid crystal layer.

14. The liquid crystal panel as defined in claim 1, wherein said at least one transparent layer is formed is formed of different materials having different refractive indices, disposed in different locations within the same flat surface region facing said liquid crystal layer.

15. The liquid crystal panel as defined in claim 1, wherein a plurality of said transparent layers are stacked, and adjacent transparent layers are formed of materials having different refractive indices.

16. The liquid crystal panel as defined in claim 15, wherein a number of said superimposed transparent layers within a region facing said liquid crystal layer differs with location.

17. The liquid crystal panel as defined in claim 1, wherein first to Nth (where $N \geq 2$) of said transparent layers are stacked, and adjacent transparent layers are formed of materials having different refractive indices;

wherein said first transparent layer located in a previous stage in said light-incident direction is formed to be in contact with a surface on the opposite side of said second substrate from said opposing surface, and said Nth transparent layer is formed to be in contact with an air layer; and wherein the refractive indices of said first to Nth transparent layers are set to increase in said light-incident direction.

18. Electronic equipment comprising:

a liquid crystal panel which is disposed on a side on which external light is incident; and a background display portion which is forward of said liquid crystal panel with respect to a light-incident direction;

wherein said liquid crystal panel comprises:

a first substrate which is disposed on said side on which external light is incident and on which at least one first electrode is formed;

a second substrate which is disposed facing said first substrate and on which at least one second electrode is formed;

a liquid crystal layer which is inserted between opposing surfaces of said first and second substrates and which is set to one of a light-transmitting state and a light-scattering state, based on a voltage applied between said at least one first electrode and said at least one second electrode, to make said background display portion visible when in said light-transmitting state; and at least one transparent layer disposed between said at least one second electrode and said second substrate, wherein said at least one transparent layer is formed of a material having a refractive index that differs from the refractive indices of said at least one second electrode and said second substrate.

19. The electronic equipment as defined in claim 18,
wherein said background display portion comprises a light-reflecting portion of a low brightness.

20. The electronic equipment as defined in claim 18,
wherein said background display portion is an analog timepiece comprising a dial plate and an indicator means.

21. The electronic equipment as defined in claim 18, further comprising illumination means for illuminating said background display portion.

22. The electronic equipment as defined in claim 18,
wherein said background display portion comprises a light-emitting portion for emitting an optical pattern for a background image.

23. The electronic equipment as defined in claim 22,
wherein said light-emitting portion is a liquid crystal panel for a background image display having a backlight.

24. The electronic equipment as defined in claim 22,
wherein said light-emitting portion comprises means for self-generating light from an electrical supply.

25. A liquid crystal panel comprising:
a first substrate having an inner surface and an outer surface, said outer surface facing incident external light;
at least one first electrode disposed on said first substrate;
a second substrate having an inner surface and an outer surface, said second substrate being disposed such that said inner surface of said second substrate faces said inner surface of said first substrate;
at least one second electrode disposed on said second substrate;
a liquid crystal layer interposed between said inner surfaces of said first and second substrates, said liquid crystal being operable in a light-transmitting state and a light-scattering state according to a voltage applied between said first and second electrodes; and
at least one transparent layer disposed between said liquid crystal layer and said at least one second electrode, said at least one transparent layer having a refractive index different from a refractive index of an optically transmissive medium adjacent said at least one transparent layer.

26. The liquid crystal panel of claim 25 wherein said at least one transparent layer is selected from the group including glass, polymer films, transparent electrode materials, and interference films.

27. The liquid crystal panel of claim 25 wherein said at least one transparent layer is disposed adjacent said outer surface of said second substrate.

28. The liquid crystal panel of claim 27 wherein a layer of air is interposed between said at least one transparent layer and said outer surface of said second substrate.

29. The liquid crystal panel of claim 25 wherein said at least one transparent layer comprises a plurality of materials having a plurality of refractive indices.

30. The liquid crystal panel of claim 29 wherein at least some of said plurality of materials are co-planar.

31. The liquid crystal panel of claim 29 wherein at least some of said plurality of materials are stacked.

32. A liquid crystal panel comprising:
a first substrate which is disposed on a side on which external light is incident and on which is formed at least one first electrode;
a second substrate which is disposed facing said first substrate and on which at least one second electrode is formed;
a liquid crystal layer which is inserted between opposing surfaces of said first and second substrates and which operates in a light-transmitting state and a light-scattering state, based on a voltage applied between said at least one first electrode and said at least one second electrode; and
at least one transparent layer disposed forward of said liquid crystal layer in a light-incident direction;
wherein said at least one transparent layer is formed of different materials having different refractive indices, disposed in different locations within the same flat region facing said liquid crystal layer.

33. A liquid crystal panel comprising:
a first substrate which is disposed on a side on which external light is incident and on which is formed at least one first electrode;
a second substrate which is disposed facing said first substrate and on which at least one second electrode is formed;
a liquid crystal layer which is inserted between opposing surfaces of said first and second substrates and which operates in a light-transmitting state and a light-scattering state, based on a voltage applied between said at least one first electrode and said at least one second electrode; and
a plurality of transparent layers disposed forward of said liquid crystal layer in a light-incident direction, the plurality of transparent layers being stacked, and adjacent transparent layers being formed of materials having different refractive indices,
wherein a number of said superimposed transparent layers within a region facing said liquid crystal layer differs with location.

* * * * *

UNITED STATES PATENT AND TRADEMARK OFFICE
CERTIFICATE OF CORRECTION

PATENT NO. : 6,292,243 B1
DATED : September 18, 2001
INVENTOR(S) : Hiroshi Shingu et al.

It is certified that error appears in the above-identified patent and that said Letters Patent is hereby corrected as shown below:

Column 3,
Line 37, "arid" should be -- and --.

Column 5,
Line 33, delete "to".

Column 8,
Line 13, delete "a" and substitute -- an -- therefor.

Column 11,
Line 54, "A" should be --$\lambda$--.

Column 12,
Line 55, "van" should be -- can --.

Column 16,
Line 9, "no" should be -- $n_o$ --.
Line 13, delete "if" and substitute -- is -- therefor.

Column 17,
Line 34, "condustors" should be -- conductors --.
Line 51, "or" should be -- on --.

Column 20,
Line 5, delete "on" and substitute -- one -- therefor.
Lines 15-16, delete second occurrence of "is formed".

Signed and Sealed this

Twenty-third Day of April, 2002

*Attest:*

*Attesting Officer*

JAMES E. ROGAN
*Director of the United States Patent and Trademark Office*